United States Patent

[11] 3,587,419

[72] Inventors Donald F. Blazek Bensenville; Elmer J. Bury, Wheaton; Robert W. Moore, Glendale Heights; Oliver J. Smith, Crystal Lake, Ill.

[21] Appl. No 769,585
[22] Filed Oct. 22, 1968
[45] Patented June 28, 1971
[73] Assignee The United States of America as represented by the Secretary of the Navy

[54] DEVICE FOR RECORDING DATA ON FILM
1 Claim, 6 Drawing Figs.

[52] U.S. Cl. .......... 95/1.1, 95/12.5, 346/107
[51] Int. Cl. .......... G03b 17/24
[50] Field of Search .......... 95/1.1, 12.5; 346/107

[56] References Cited

UNITED STATES PATENTS 3,381,573 5/1968 Caldwell .......... 355/8

OTHER REFERENCES

IBM TECHNICAL DISCLOSURE BULLETIN, Vol. 9, No. 11, April 1967, page 1522, 355— 8.

*Primary Examiner*—John M. Horan
*Attorneys*—Edgar J. Brower, H. H. Losche and Paul S. Collignon

ABSTRACT: A device for recording auxiliary data on moving film from a stationarily mounted cathode-ray tube, without skewing of the recorded data image said film being in contact with a movable platen, the improvement comprising a lens attached to said movable platen, a first prism for directing an image from said cathode-ray tube through said lens and a second prism for directing said image from said lens onto said moving film.

ELMER J. BURY, INVENTORS
DONALD F. BLAZEK,
ROBERT W. MOORE, OLIVER J. SMITH

BY H. H. Losche
Paul S Collignon
ATTORNEYS

PATENTED JUN 28 1971 3,587,419

INVENTORS
ELMER J. BURY, DONALD F. BLAZEK,
ROBERT W. MOORE, OLIVER J. SMITH

BY H. H. Losche
Paul S. Collignon
ATTORNEYS

DEVICE FOR RECORDING DATA ON FILM

CROSS-REFERENCES TO RELATED APPLICATIONS

Patent application of Elmer J. Bury, entitled "Device For Controlling Movement of A Camera Platen," Ser. No. 769,272, filed Oct. 21, 1968.

BACKGROUND OF THE INVENTION

Presently various information is being placed on film which is utilized in aerial photography. By way of example, this information might show longitude, latitude, heading, altitude, ground speed, and the like, so that an observer who views the developed film will know the conditions under which the picture was taken. This auxiliary data can be in the form of coded information and arranged in rows and columns of dots on the screen of a cathode-ray tube. Ordinarily, the dot pattern is generated on the screen of the cathode-ray tube by intensity modulation of a spot that scans the screen area. This dot matrix presentation is commonly called a series presentation and is formed one dot at a time by a scanning technique.

The same effect can be produced by a parallel presentation in which the entire dot matrix is electronically performed and flashed upon the screen of the cathode-ray tube as a unit. While each technique has its advantages and disadvantages, the lower cost and lighter weight of the series presentation system generally is preferred over the parallel system, particularly in airborne applications.

In the usual series cathode-ray tube display system, a small cathode-ray tube is located inside a camera magazine and an image is formed on film which is brought into contact with the cathode-ray tube, which may have a fiber optic face plate. By way of example, a small cathode-ray tube having a fiber optic face plate is shown and described on page 6 of the text, Optical Processing Of Information, published by Spartan Books, Inc. (1963). Data is thus recorded in a particular space on each frame of the film and does not present any problem when the film is stationary during exposure. In aerial photography, however, when moving film is employed in an image motion compensation technique, there is a disadvantage due to the relative motion between the film and the cathode-ray tube during exposure. The combination of relative motion and the time consumed by the scanning of the series system technique causes the dot matrix image to be skewed upon the film, with the degree of skew varying as a function of the film speed.

One method of eliminating the skewed image would involve stopping the film prior to exposure to the data on the cathode-ray tube. This method, however, would drastically reduce the cycling rate of the camera and thus most prior art systems tolerate the skewed data image. The main disadvantage of the skewed presentation is that the rhomboidal area of the skewed image occupies a much greater share of the total film format than is necessary.

SUMMARY OF THE INVENTION

In the present invention, a small cathode-ray tube is stationarily mounted within a camera housing and a recording lens is attached to a movable platen. A first total reflecting prism is positioned between the cathode-ray tube and the recording lens to reflect, at right angles, images from the cathode-ray tube into the recording lens, and a second total reflecting prism is positioned in back of the recording lens to reflect images passing through the recording lens onto film which is movable with the platen.

It is therefore a general object of the present invention to provide an improved means of recording auxiliary data on film so that a minimum area of film is utilized.

Other objects and advantages of the present invention will be readily appreciated as the same becomes better understood by reference to the following detailed description when considered in connection with the accompanying drawings.

DESCRIPTION OF THE PREFERRED EMBODIMENT

Figure 1B:
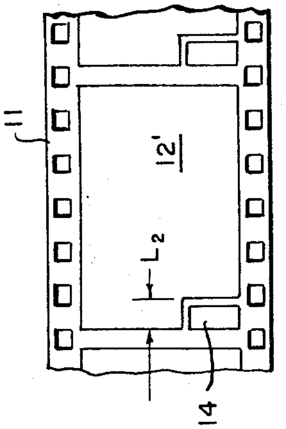
FIG. 1*b* is a plan view illustrating the position of auxiliary data on film as recorded by the present invention.
Figure 1A:
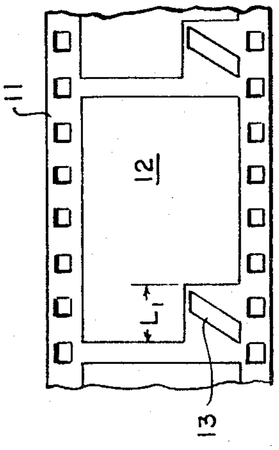
FIG. 1a. (PRIOR ART)
FIG. 1*a* is a plan view illustrating a prior art method of recording auxiliary data on film.

Referring now to the drawings, FIG. 1*a* shows a portion of film 11 having an area 12 which represents that portion of the film utilized for a picture and an area 13 which is utilized for depicting auxiliary data from a cathode-ray tube. As the auxiliary data is recorded on film 11 by steps, that is, by the series scanning of the cathode-ray tube, and as film 11 is moving due to the camera employing image motion compensation, the data depicted in area 13 will be skewed. FIG. 1*b* shows an area 14 which depicts auxiliary data presented by the present invention and which is not skewed, and thus the dimension $L_2$ is shorter than the dimension $L_1$ of FIG. 1*a* and, consequently, the area 12' of FIG. 1*b* available for a picture is greater than the area 12 of FIG. 1*a*.

Figures 2A, 2B, 2C:
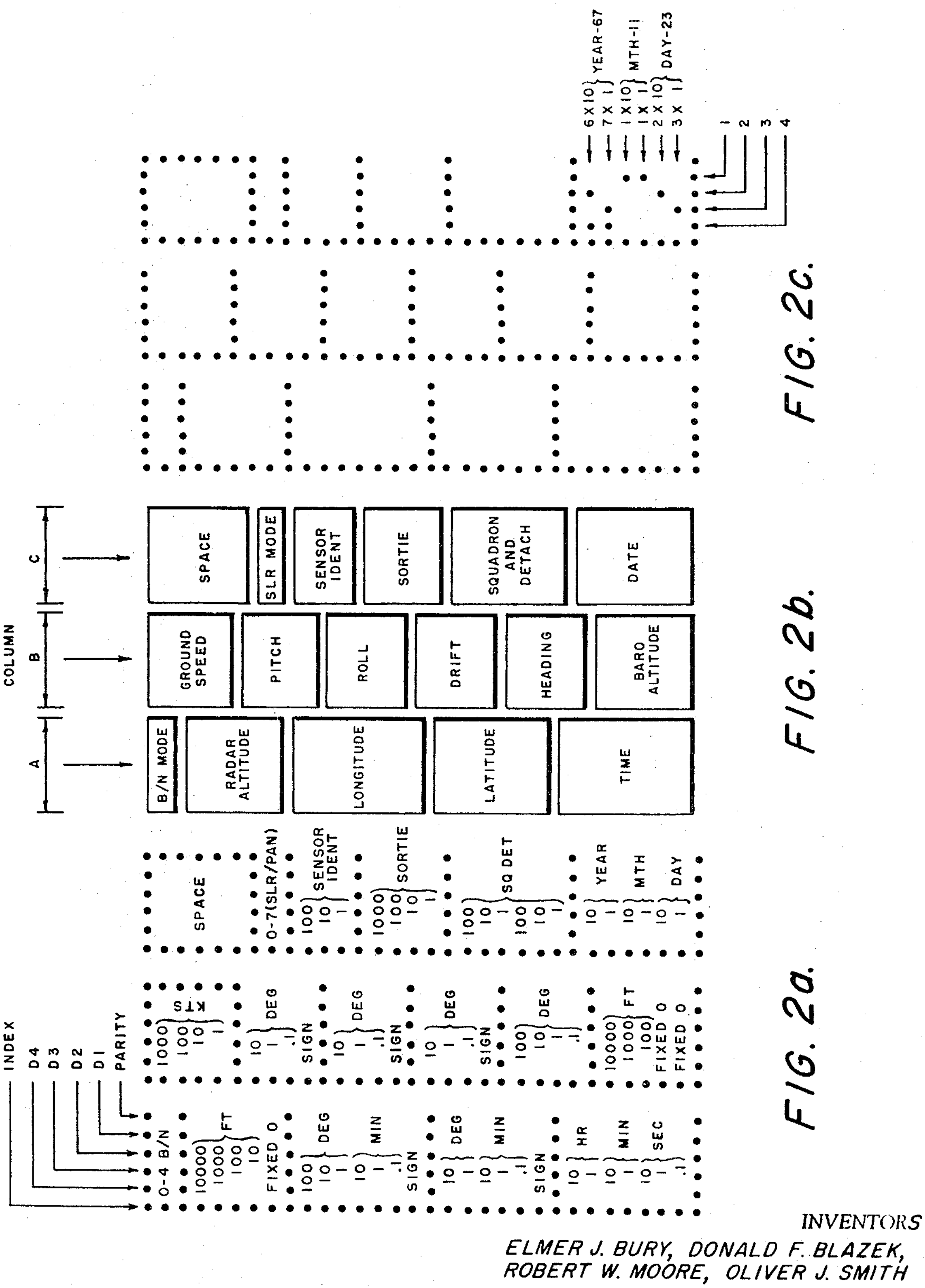
FIG. 2*a*, 2*b*, and 2*c* are diagrammatic views showing an arrangement of auxiliary data to be recorded on film.

FIG. 2*b* of the drawings shows the various types of auxiliary information that might be recorded on film during a reconnaissance mission by a military aircraft. FIG. 2*a* depicts the various rows and units which are utilized in recording the auxiliary information of FIG. 2*b*, and FIG. 2*c* is an example of dots showing the manner in which a date is depicted on film.

Figure 3:
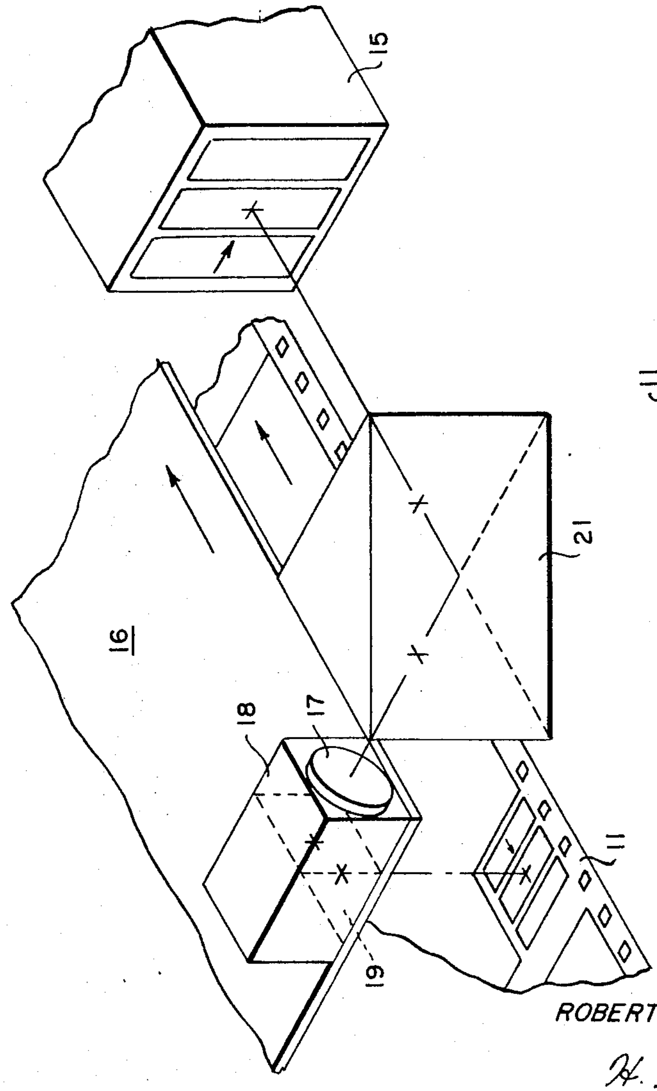
FIG. 3 is a schematic view showing a preferred embodiment of the present invention.

Referring now to FIG. 3 of the drawings, there is shown a small cathode-ray tube 15 which is mounted within a camera housing (not shown) and which is suitable for depicting on its screen the auxiliary information shown in FIG. 2*b*. The information on the screen of cathode-ray tube 15 is recorded on film 11 which is moved along with platen 16 to provide image motion compensation. The movement of camera platen 16 might be accomplished by one of several devices well known in the art and, by way of example, one such device for controlling movement of a camera platen in an image motion compensation system is shown and described in the above-referenced application. A recording lens 17 is attached to platen 16 by means of a housing 18 which also contains a reflecting prism 19 that reflects an image passing through lens 17 onto film 11. Another prism 21 is positioned between cathode-ray tube 15 and lens 17 and prisms 19 and 21 provide a folded optical path between cathode-ray tube 15 and film 11. Prisms 19 and 21 are known as total reflection prisms and are well known in the optical art and, by way of example, are shown and described on pages 50—53 of the text, Optics And Service Instruments, Chemical Publishing Company, Inc., (1941).

OPERATION

In operation, assuming the device shown in FIG. 3 is positioned within an aerial camera having an image motion compensation system, platen 16 moves in the direction shown by the arrow and likewise, film 11 moves in the direction of the arrow, and this direction is the direction of flight. As more fully described in the above-referenced application, film 11 is normally held firmly against platen 16 during movement as, for example, by a partial vacuum applied through platen 16. In FIG. 3 of the drawings, film 11 and platen 16 are shown separated for purpose of clarity. A typical exposure cycle requires platen 16 to press against film 11, travel with the film during exposure, release the film, and then return platen 16 to its initial starting position. While film 11 is moving and being exposed, as by example, to a ground scene below an aircraft, auxiliary data from cathode-ray tube 15 is reflected by prism 21 through lens 17 and then again reflected by prism 19 onto a corner of film 11. As lens 17 is attached to platen 16, lens 17 moves with platen 16 while the series scanning of cathode-ray tube 15 is taking place, and thus there is maintained an unchanging relationship between area 14 and area 12', and no skewed positioning of area 14 is depicted. After exposure, platen 16 releases film 11 and platen 16 returns to its starting position to again cycle.

It can thus be seen that the present invention provides an improved device for transferring data from the screen of a cathode-ray tube to a moving film. Obviously many modifications and variations of the present invention are possible in the light of the above teachings. It is therefore to be understood, that within the scope of the appended claims, the invention may be practiced otherwise than as specifically described.

We claim:

1. In a camera having a housing, a cathode-ray tube mounted within said housing, a strip of photographic film, and a movable platen in contact with said strip of photographic film, the improvement comprising:
   - a lens attached to said movable platen,
   - a first total reflecting prism stationarily mounted in said housing for directing an image from said cathode-ray tube through said lens, and
   - a second total reflecting prism attached to said platen for directing said image from said lens onto said strip of photographic film.